(12) United States Patent
Beukema et al.

(10) Patent No.: US 8,651,686 B2
(45) Date of Patent: Feb. 18, 2014

(54) LIGHTING UNIT FOR LIGHTING AIRFIELDS

(75) Inventors: Martijn Beukema, Brussels (BE); Ludo Moons, Herentals (BE)

(73) Assignee: ADB BVBA, Zaventem (BE)

( * ) Notice: Subject to any disclaimer, the term of this patent is extended or adjusted under 35 U.S.C. 154(b) by 85 days.

(21) Appl. No.: 13/499,381

(22) PCT Filed: Sep. 30, 2010

(86) PCT No.: PCT/EP2010/064564
§ 371 (c)(1),
(2), (4) Date: May 18, 2012

(87) PCT Pub. No.: WO2011/039309
PCT Pub. Date: Apr. 7, 2011

(65) Prior Publication Data
US 2012/0218742 A1    Aug. 30, 2012

(30) Foreign Application Priority Data

Sep. 30, 2009   (DE) .......................... 10 2009 043 534

(51) Int. Cl.
   *E01F 9/00*        (2006.01)
(52) U.S. Cl.
   USPC ....................................... 362/153.1; 362/240
(58) Field of Classification Search
   USPC ........ 362/153.1, 145, 153, 293, 559, 240, 11; 340/947, 953, 955
   See application file for complete search history.

(56) References Cited

U.S. PATENT DOCUMENTS

| | | | | |
|---|---|---|---|---|
| 4,856,896 A | * | 8/1989 | Farr | 356/153 |
| 2002/0075690 A1 | * | 6/2002 | Mullen | 362/427 |
| 2004/0252489 A1 | * | 12/2004 | Hagen | 362/153.1 |
| 2006/0262542 A1 | * | 11/2006 | Ibbitson et al. | 362/368 |
| 2007/0070618 A1 | * | 3/2007 | Talamo et al. | 362/153.1 |

FOREIGN PATENT DOCUMENTS

| | | |
|---|---|---|
| DE | 19837224 A1 | 3/2000 |
| DE | 10242728 A1 | 4/2003 |
| DE | 20309405 U1 | 10/2003 |
| WO | WO 2005/011329 A2 | 2/2005 |

OTHER PUBLICATIONS

ADB: "LED Taxiway Centre Line, Stop Bar and Intersection Medium Intensity Inset Light" Mar. 7, 2011.
English translation of DE 20309405 U1.
English machine translation of DE 10242728 A1 taken from the Espacenet.com.
English machine translation of DE 19837224 A1 taken from the Espacenet.com.

* cited by examiner

*Primary Examiner* — Anne Hines
(74) *Attorney, Agent, or Firm* — Black, McCuskey, Souers & Arbaugh, LPA

(57) ABSTRACT

The invention relates to a lighting unit for lighting airfields on an airport, in particular for delivering signals to an airplane. It comprises a light source, which has at least one light-emitting diode for generating light to be emitted, electrical components for supplying and actuating the light source, optical components for influencing the light generated by the light source, and an outer housing for receiving the light source and the electrical and optical components, which has a light exit opening through which light influenced by the optical components exits. According to the invention, the light source is arranged with the electrical and optical components in a cassette module closed in a gas-tight manner. Said module is integrated in the outer housing, wherein the outer housing is likewise closed in a gas-tight manner, so that the components disposed in the cassette module have double sealing protection.

15 Claims, 2 Drawing Sheets

LIGHTING UNIT FOR LIGHTING AIRFIELDS

CROSS-REFERENCE TO RELATED APPLICATIONS

Figure 1:
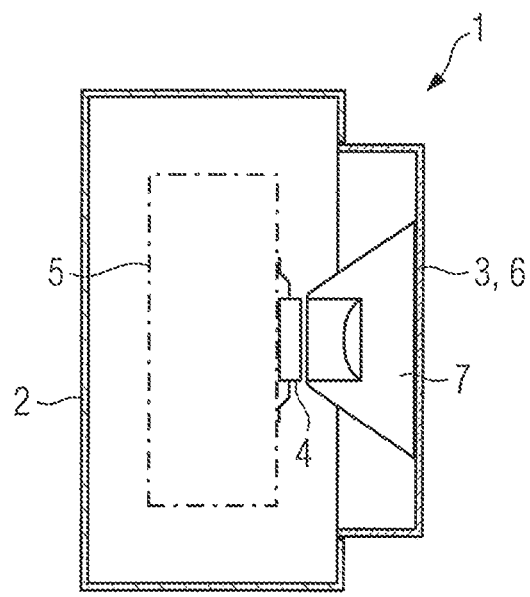

This application is the U.S. National Stage of International Patent Application No. PCT/EP2010/064564 having the international filing date of Sep. 30, 2010, which claims priority to German Patent Application No. 102009043534.4, filed on Sep. 30, 2009, all of which are incorporated herein by reference.

This invention relates to a lighting unit for lighting airfields at an airport, in particular for signaling an aircraft, having the features of the preamble of patent claim 1. Such lighting units are used for lighting airfields at airports, e.g. for signaling aircraft in approach or taxiing on a tarmac or taxiway, in particular airplanes or helicopters. A distinction is made e.g. between approach lighting, take-off and landing runway lighting, and taxiway lighting. The light emitted by a lighting unit when signaling must then comply with a certain spatial intensity distribution specified by international standards and released by organizations for standardization, such as ICAO, short for International Civil Aviation Organization, or FAA, short for Federal Aviation Administration.

From the product literature "LED—Taxiway Centre Line, Stop Bar and Intersection—Medium Intensity—Inset Light", published by ADB—A Siemens Company, under order number E10001-T95-A103-V1-7600, a flush-mounted inset light for taxiway centre lines and stop bars is known, whereby inside a housing made of aluminum alloy, optical components, such as light emitting diodes, collimators, and prisms, as well as electrical components, such as cable connectors, transformers, and circuit boards, are arranged in a distributed manner. Toward the outside, the housing is sealed from water penetration by means of a labyrinth seal between housing cup and housing cover, and by means of prism seals in the light exit openings of the cover. For each of the various signals several light emitting diodes are provided, which, during assembly at the manufacturing plant, have to be manually aligned with respect to the other optical components so as to generate the required light emission intensity profile.

The utility model specification DE 203 09 405 U1 discloses a flush-mounted inset light, which has a housing with a housing base embedded in the ground and a housing cover closing said base from above. The housing cover has two openings, into each of which a module is incorporated from above comprising a module top and a module bottom sealingly screwed thereto. Prisms are inserted into the light transmission openings of the module top. Three light emitting diodes with optics are collectively attached to a board screwed to the module bottom. The power supply of the light emitting diodes is provided for via a cable which is sealingly guided into the module through an opening. The cable is connected to a converting unit located inside the housing and connected to a supply cable. The modules are pre-assembled for the assembly of the flush-mounted inset light.

Patent publication DE 198 37 224 A1 discloses a lighting unit for lighting airfields with light emitting diodes as light sources forming several clusters. The clusters are integrated into a cassette arranged above the power supply and control device of the lighting unit. The base body respectively the housing of the cassette is entirely or partially filled with a dielectric material so that there are no cavities inside the cassette and they are inherently watertight and gastight.

Water penetrating into the housing of a lighting unit, for instance in the area of the prism of a flush-mounted inset light, may damage both the electrical and the optical system. Leakage of the lighting unit may as well occur during operation because of worn out components or ageing seals due to vibrations or direct overrun loads and following maintenance works due to defective closing of the housing when no sealing test is performed.

Maintenance work requiring an optical element to be removed or replaced implies the risk of defective assembly also with regard to the exact mounting position and the mutual alignment of the optical elements. This is all the more critical the fewer light sources are provided for a given signal of the lighting unit, as there is a risk that the required standard high precision intensity distribution of the emitted light can no longer be maintained.

Consequently, the underlying aim of the invention consists in providing a lighting unit of the type mentioned previously, requiring little assembly and maintenance effort and having a high fail safety.

According to the invention, the object is achieved by a generic lighting unit having the features indicated in the characteristics of claim 1. Accordingly, the light source has at least one light emitting diode and is arranged inside a gastightly closed cassette module together with the electrical and optical components. The cassette module is integrated into the outer housing of the lighting unit. The outer housing will provide the cassette module protection against the impact of external forces, and is also gastightly closed so that the components arranged inside the cassette module may benefit from double sealing protection.

This design offers the advantage that, if the outer housing is damaged (e.g. a crack in the light exit window) the cassette module will remain intact. Thus, water or moisture may well penetrate into the outer housing, but not into the cassette module. As the electrical components for controlling the light emitting diodes are arranged inside the gastight cassette module, damage to the outer housing will not badly affect the light source inside the cassette module, thereby eliminating the risk of failure of the light source.

The light exit opening of the outer housing may also comprise a window module, which depending on the application of the lighting unit is formed as a prism, a scattering unit, or else as a glass cover without any additional optical functionality. This window module is gastightly inserted into a light exit opening of the outer housing.

The cassette module has an opening, in which a transparent window element for radiating light is gastightly inserted. The window element has an optical element for affecting the beam shape and/or radiating direction of the exiting light beam. The optical element may, for example, be formed by a collimating device and/or a scattering device and/or a lens device or a combination of such devices. The at least one light emitting diode and the optical element are thereby positioned with respect to each other for generating a required intensity distribution of the emitted light and secured in mutual alignment.

The window module of the outer housing is distinct from the window element of the cassette module.

By using light emitting diodes as a light source the average time to the first failure thereof is significantly extended in comparison with traditional incandescent light sources, which corresponds to providing a maintenance-free light source. Therefore, maintenance work can be performed on the lighting unit without the gastight cassette module having to be opened, thereby eliminating the risk of a general failure of the electrical or optical components of the lighting unit due to water penetration. The cassette module as such is also virtually maintenance-free. As assembly and integration of the electrical and optical components into the cassette module as well as their sealing are performed by the manufacturer, product liability for sealing of the cassette module can be taken over by the manufacturer. The number of light emitting diodes used decreasing down to one mere light emitting diode, requires precise positioning with respect to other optical components, which is ensured by the manufacturer's specialists. The cassette module can be used for lighting units for unidirectional, bidirectional, and even omnidirectional light emission. The lighting unit can thereby be formed as both flush-mounted inset light and surface light. The cassette module is gastightly closed by means of an adhesive, in particular a UV curing adhesive, silicone rubber, or any other sealing element.

In a preferred configuration of the lighting unit according to the invention, the cassette module has a module housing receiving the electrical components and a module lid closing the module housing, which module lid comprises the opening with the gastightly inserted window element. The module lid can for instance be produced separately and includes a seal against water penetration, and the window element with the optical elements for affecting the beam, which are positioned and secured in alignment with respect to the light emitting diodes.

In a preferred embodiment of the lighting unit according to the invention, markings and/or mechanical mounting aids are provided, by means of which the light emitting diodes and the window element with the optical element can be positioned with respect to each other and can be secured in mutual alignment. The window element, for example, has markings allowing for an optimally aligned assembly with the circuit board of the light emitting diodes. Here, the above-described possible optimal intensity distribution is virtually achieved through active alignment. Preferably, this is applied for each window element when several signals are produced.

In an advantageous configuration of the lighting unit according to the invention, the module housing and/or the module lid and/or an outer shell of the cassette module are formed to have high thermal conductivity. As a result, the heat generated by the light emitting diodes and other electrical components can be released to the environment. This is advantageous because efficiency and durability of the light emitting diodes increase when the maintained operating temperature decreases.

Preferably, the window element and the module lid of the cassette module of the lighting unit according to the invention are formed to be one-piece and transparent. This one-piece component can be made out of polycarbonate. As a result, it is advantageously possible to keep a low number of parts for a lighting unit according to the invention. Furthermore, separately connecting and sealing the window element and module lid are avoided.

In another advantageous embodiment of the lighting unit according to the invention, the light source is formed for generating light for various signals, wherein only a few light emitting diodes or merely one light emitting diode is/are associated with each signal. As light emitting diodes, preferably high performance light emitting diodes come into consideration, through which electrical currents of an intensity of 0.1 A to at least 3.0 A are flowing, having a heat resistance of e.g. at least 8 K/W, and emitting a light current of at least 20 lm to 150 lm. Depending on the application, the high performance light emitting diode can have a Lambert, Batwing, or side radiation characteristic. This allows for several signals to be combined with a single window element, which is particularly advantageous for lighting units for signal output having a low form factor.

Thereby, the light emitting diodes are preferably arranged on a circuit board, and formed depending on the signal to be emitted, for generating light in the visible spectrum, in particular blue, green, yellow, orange, red or white light, or light in the infrared spectrum. The colour white can then be generated by phosphor inversion and/or an RGB mixing technique. It is also possible to use large surface radiating light emitting diodes. Through infrared radiation, aircraft fitted with infrared sensors can detect the infrared light emitted by the lighting units, as is already the case with halogen lamps.

In another advantageous configuration of the lighting unit according to the invention, the light emitting diodes are arranged on a circuit board having an optical element for affecting the beam. The optical elements connected to the light emitting diodes can advantageously already be aligned with respect to each other by the manufacturer.

In another preferred configuration of the lighting unit according to the invention, the window element and/or the circuit board have optical elements for affecting the beam for each signal to be emitted. Depending on the signal, some optical elements may strongly focus a light beam, while other optical elements of about the same window element may widely fan out a light beam.

In another preferred configuration of the lighting unit according to the invention, a power supply line is gastightly inserted into the cassette module for connecting the electrical components to an external power source. The power source may be a constant current source or else a constant voltage source.

In another advantageous embodiment of the lighting unit according to the invention, the cassette module is filled with an inert gas. Hereby, a dry atmosphere can be created inside the cassette module preventing condensation-induced failure of the electrical or optical components.

In another preferred configuration of the lighting unit according to the invention, a desiccant is introduced into the cassette module. As a result, residual humidity, which may otherwise condense, will be bound, in particular when using light emitting diodes which hardly produce any waste heat. Condensed water vapour might deposit on optical components as a dispersive layer reducing light exit.

Figure 2:
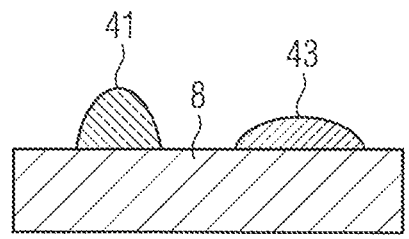
Figure 3:
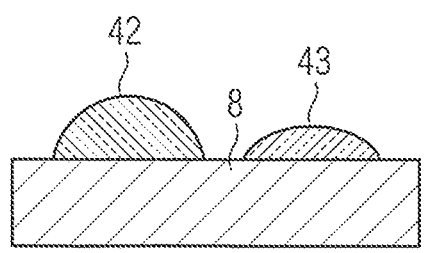
Figure 4:
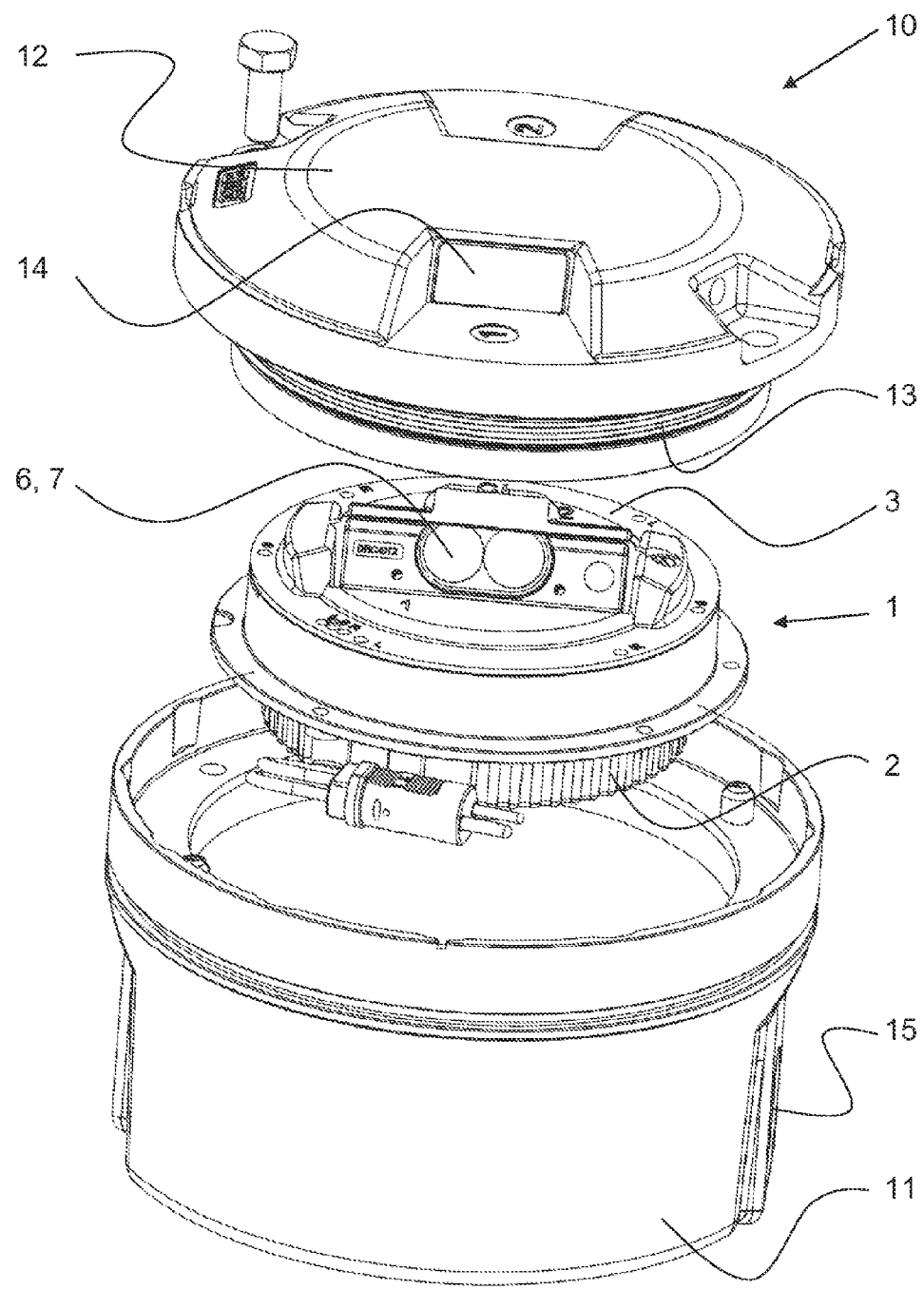

Further properties and advantages of the lighting unit according to the invention are presented in the following description of an example embodiment represented in the drawings, in which FIG. 1 schematically shows a cross-section through a gastight cassette module, FIG. 2 and FIG. 3 schematically show circuit boards with light emitting diodes of a lighting unit according to the invention, FIG. 4 schematically shows an exploded representation of a flush-mounted inset light according to the invention.

According to FIG. 1, a gastight cassette module 1 for integration into a not fully represented lighting unit according to the invention, which is not represented, has a module housing 2 and a module lid 3. In the module housing 2, a light source formed of light emitting diodes 4 and electrical components 5 are arranged comprising power lines and a driver circuit for driving the light emitting diodes 4, which are not represented in great detail. The module housing 2 is made of a material exhibiting high thermal conductivity for releasing the heat generated during operation of the electrical components 5 to the environment. The module lid 3 is produced in one piece from optically transparent polycarbonate and has a translucent window element 6. On the window element 6, optical elements 7 are moulded, which are formed for affecting the beam shape and/or beam direction of the light generated by the light emitting diodes 4. The optical elements 7 are not represented in detail and can have devices for light focusing, scattering, diffracting, reflecting, and the like.

For the manufacturing of the gastight cassette module 1, the module lid 3 is glued to the module housing 2. Thereby, the module lid 3 and the module housing 2 are assembled by means of an adhesive, e.g. by means of a UV curing adhesive or silicone rubber, wherein the light emitting diodes 4 are actively positioned and aligned in relation to the optical elements 7. While position and alignment are being maintained the adhesive is allowed to cure. Thereby, position and alignment are oriented according to the optical axis of the light emitting diode 4 in order to achieve optimum intensity distribution of the emitted light. This is characterized by maximum peak intensity together with a very minimum full width at half maximum. Furthermore, the optimum intensity distribution will cause minimum optical losses. Thereby, positioning and alignment can also be performed with an active mounting aid, by means of which all degrees of freedom of movement can be set in a motorised manner.

Alternatively, the module housing 2 can be gastightly closed by means of the module lid 3, e.g. by implementing an O-ring.

According to FIG. 2 and FIG. 3, the light source consists of a circuit board 8 fitted with light emitting diodes 41 to 43. Thereby, different light emitting diodes 41 to 43 are provided for each signal to be emitted by the lighting unit. Preferably, a single high performance light emitting diode is provided for each signal. If the various signals for instance a green clearance signal and a red stop signal at a stop bar on a taxiway before a runway junction require different intensity distributions, then the window element 6 has different optical elements 7 depending on the signals. The optical elements 7 can also be arranged on circuit board 8 above the light emitting diodes 41 to 44. The light emitting diodes 43 represented in FIG. 2 and FIG. 3 to the right, for instance emitting red light, have an optical element of larger curvature on the light exit surface, which are thus less dispersive, while in the light emitting diodes 41 or 42 respectively represented to the left and for instance emitting green light, the light emitting diode 41 of FIG. 2 has a lower curvature on the light exit surface than the light emitting diode 42 represented in FIG. 3.

FIG. 4 shows an exploded representation of a lighting unit 10 according to the invention. The cassette module 1 is placed in an outer housing made up of a inset base 11 or a mounting pot and an adapted lid, in general both made of aluminum.

The lighting unit represented in FIG. 4 is a flush-mounted inset light. The inset base 11 is typically fastened in the ground, in concrete or asphalt by means of an adhesive.

The holes 15 for cables entering into the inset base 11 are gastightly closed. Gastight sealing is ensured for instance by a rubber seal 13 between the inset base 11 and the lid 12.

The gastightly closed cassette module 1, which comprises the light source as well as the electrical components for supplying and driving the light source and the optical components 7 for affecting the light generated by the light source, fits into the inset base 11 and under the lid 12. The lid 12 comprises light exit openings 14 through which the light affected by the optical components 7 of the cassette module 1 exits. The light exit openings 14 can be made from a prism or any other transparent element inserted into an opening of the lid 12 and gastightly closed.

The advantage of the lighting unit according to the invention is that if the prism 14 is broken, e.g. if it is damaged by a pebble projected by an air stream of the airplane driving mechanism, the cassette module 1 will remain intact so that the light source, as well as the optical and electrical components remain protected against weather effects, such as humidity.

The invention claimed is:

1. A lighting unit for lighting airfields at an airport, in particular for signaling an aircraft, comprising a light source for generating light to be radiated and having at least one light emitting diode, electrical components for supplying and steering the light source, optical components for affecting the light generated by the light source, and an outer housing for receiving the light source as well as the electrical and optical components, the outer housing having a light exit opening through which light affected by the optical components will exit, wherein the lighting unit comprises a gastightly closed cassette module, in which the light source is arranged together with the optical components, wherein the electrical components are equally arranged inside the gastightly closed cassette module, the cassette module has an opening into which a transparent window element for radiating light is gastightly inserted, which has an optical element for affecting the beam shape and/or radiation direction of the exiting light beam, and wherein the light emitting diode and the optical element are positioned with respect to each other and secured in mutual alignment for generating a required intensity distribution of the radiated light, and the cassette module is integrated into the outer housing, wherein the outer housing is also gastightly closed, so that the components arranged inside the cassette module benefit from double tightness protection.

2. The lighting unit according to claim 1, wherein the light exit opening of the outer housing has a window module which is distinct from the window element of the cassette module.

3. The lighting unit according to claim 2, wherein the module housing and/or the module lid and/or an external shell of the cassette module are formed to have high thermal conductivity.

4. The lighting unit according to claim 2, wherein the window element and the module lid of the cassette module are formed to be one-piece and transparent.

5. The lighting unit according to claim 1, wherein the cassette module has a module housing receiving the electrical components and a module lid closing the module housing and comprising the opening with the gastightly inserted window element.

6. The lighting unit according to claim 1, wherein markings and/or mechanical mounting aids are provided, by means of which the light emitting diodes and the window element with the optical element can be secured so that they can be positioned with respect to each other and mutually aligned.

7. The lighting unit according to claim 1, wherein the light source is made for generating light for various signals, wherein few or just one light emitting diode(s) are/is associated with each signal.

8. The lighting unit according to claim 7, wherein the light emitting diodes are arranged on a circuit board and are formed according to the signal to be emitted for generating light in the visible spectrum, in particular blue, green, yellow, orange, red, or white light, or light in the infrared spectrum.

9. The lighting unit according to claim 1, wherein the light emitting diodes are arranged on a circuit board having an optical element for affecting the beam.

10. The lighting unit according to claim 9, wherein the circuit board has optical elements for affecting the beam for each signal to be output.

11. The lighting unit according to claim 1, wherein the window element has optical elements for affecting the beam for each signal to be output.

12. The lighting unit according to claim 1, wherein a power supply line for connecting the electrical components to an external power source is introduced into the cassette module in a gastight manner.

13. The lighting unit according to claim 1, wherein the cassette module is filled with an inert gas.

14. The lighting unit according to claim 1, wherein a desiccant is introduced into the cassette module.

15. The lighting unit according to claim 1, formed as a flush-mounted inset light.

* * * * *